Nov. 5, 1940.   G. J. CYNOSKE   2,220,317
COTTER PIN REMOVING TOOL
Filed Sept. 19, 1939
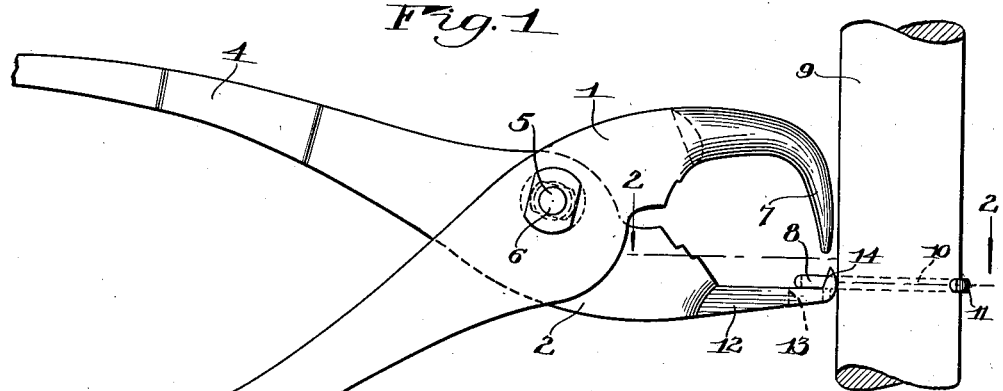
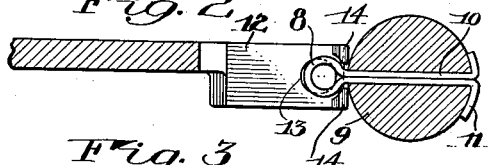
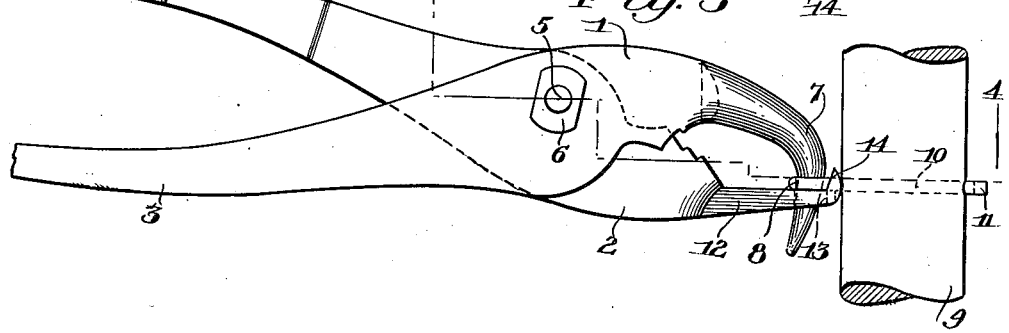
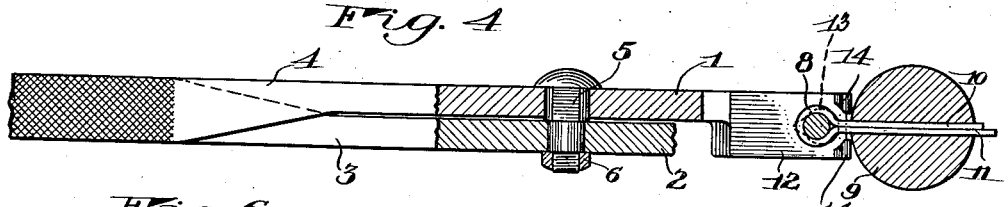
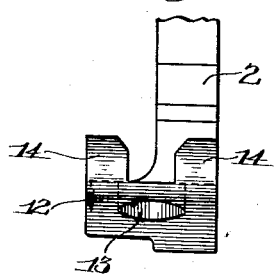
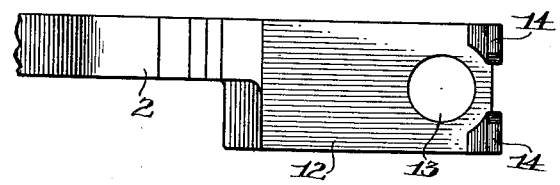
INVENTOR.
George J. Cynoske
BY Harold E. Stonebraker,
his ATTORNEY.

Patented Nov. 5, 1940

2,220,317

UNITED STATES PATENT OFFICE 2,220,317

COTTER PIN REMOVING TOOL

George J. Cynoske, Middletown, Conn.

Application September 19, 1939, Serial No. 295,637

1 Claim. (Cl. 81—5.1)

This invention relates to a cotter pin removing tool, and has for its object to afford a device of simple construction, which can be economically manufactured, and will afford a practical device for the purpose.

More particularly the invention has for its object to provide a construction that can easily and quickly be positioned in operative relation to a cotter pin and conveniently manipulated, affording a leverage such that an operator can with little effort and instantly remove a cotter pin from any part to which it may be attached.

To these and other ends, the invention consists in the construction and arrangement of parts that will appear from the following description when read in conjunction with the accompanying drawing, the novel features being pointed out in the claim following the specification.

In the drawing:

Fig. 1 is a side elevation of a tool constructed in accordance with a preferred embodiment of the invention, showing it in the position of initial application to a cotter pin for removing the latter from its support;

Fig. 2 is a transverse sectional view on the line 2—2 of Fig. 1;

Fig. 3 is a view similar to Fig. 1 showing the position of the parts when the jaws have been closed and the cotter pin partially withdrawn from its support;

Fig. 4 is a transverse sectional view on the line 4—4 of Fig. 3;

Fig. 5 is a view in elevation, partially broken away, of one of the jaws, and

Fig. 6 is an end elevation of the same.

Referring more particularly to the drawing in which like reference characters throughout the several views refer to the same parts, 1 and 2 designate a pair of jaws provided with handle portions 3 and 4 respectively, and held in pivotal relationship by means of a bolt 5 and nut 6, as usual in plier constructions.

The jaw 1 is preferably rounded toward its end, as shown, and provided with an angularly arranged or laterally extending eye-engaging portion 7 that is preferably rounded or circular in cross-section, and tapered or pointed as shown in Fig. 1. The eye-engaging portion 7 is adapted to engage or pass through the eye 8 of a cotter pin, that is illustrated as secured to a bar or support 9, and includes a body portion 10 and bent ends 11 that normally hold the cotter pin in place. As the device is operated, the eye-engaging portion 7 passes through the eye 8, as shown in Fig. 2, and forcibly draws the cotter pin away from the support 9, at the same time straightening the bent extremities 11, as illustrated in Fig. 4.

To accomplish this, the jaw 2 is provided with a flattened portion 12 having an opening 13 extending transversely thereof, while 14 designates a pair of laterally extending lugs or ears spaced from each other and preferably tapered as shown, the ears 14 being located at the outer ends of the flattened portion 12 so as to straddle the body 10 of the cotter pin, and occupy a position between the support 9 and the eye 8, as shown in Fig. 2. The opening 13 is somewhat larger than the eye 8 and eye-engaging portion 7, which latter is so formed with relation to its jaw 1 that as the jaws are closed, the eye-engaging portion 7 moves bodily across the opening 13 from the outer to the inner edge thereof, or from the position of Fig. 1 to the position of Fig. 3, thus forcibly drawing the cotter pin endwise of the tool and withdrawing it far enough from its support so that it can be easily removed by pulling it outwardly.

The operation of the device briefly is as follows: To remove a cotter pin, the jaws of the tool are opened, as shown in Fig. 1, and the jaw 2 is positioned against the support 9 in the manner illustrated in Figs. 1 and 2 with the lugs 14 straddling the body of the cotter pin and located between the eye 8 and support 9, the eye 8 being located over the outer portion of opening 13 of the jaw 2. Thereupon the handle 3 of jaw 1 is moved toward the handle 4 to move jaw 1 downwardly, causing the eye-engaging portion 7 to move through the eye 8 and the opening 13 in the jaw 2. During this movement, the eye-engaging portion 7 moves bodily from one side of the opening 13 to the other side thereof and draws the eye 8 correspondingly from the position shown in Figs. 1 and 2 to that shown in Fig. 3, and at the same time straightening the bent ends 11 so that the subsequent removal of the cotter pin can be easily accomplished.

While the invention has been described with reference to the particular construction herein shown, it is not confined to the particular details illustrated, and this application is intended to cover such modifications or departures as may come within the purposes of the invention or the scope of the following claim.

I claim:

A cotter pin removing tool comprising a pair of pivoted jaws, one of said jaws having an opening extending transversely thereof, and a pair of laterally extending lugs at its outer end on opposite sides of said opening, said lugs acting to straddle the body of a cotter pin between the eye thereof and the cotter pin support and thereby to hold said jaw in alinement with the cotter pin, the other of said jaws terminating in a tapered eye-engaging portion extending laterally from the body of the jaw and inwardly toward the pivotal point, said eye-engaging portion being rounded in cross-section and movable through said opening in the other jaw, said opening being substantially larger than the eye-engaging portion, whereby the eye-engaging portion acts to move the cotter pin between said lugs endwise of the jaw containing said opening and endwise of the tool as the jaws are brought together.

GEORGE J. CYNOSKE.